(12) United States Patent
Vann

(10) Patent No.: US 10,181,375 B1
(45) Date of Patent: Jan. 15, 2019

(54) HIGH-DENSITY, FOLDED ELECTROMAGNETIC COIL

(71) Applicant: Charles Stuart Vann, El Granada, CA (US)

(72) Inventor: Charles Stuart Vann, El Granada, CA (US)

(73) Assignee: VANNTEC LLC, El Granada, CA (US)

( * ) Notice: Subject to any disclaimer, the term of this patent is extended or adjusted under 35 U.S.C. 154(b) by 104 days.

(21) Appl. No.: 15/269,496

(22) Filed: Sep. 19, 2016

(51) Int. Cl.
*H01F 5/00* (2006.01)
*H01F 27/28* (2006.01)
*H02K 3/04* (2006.01)

(52) U.S. Cl.
CPC .......... *H01F 27/2866* (2013.01); *H01F 5/00* (2013.01); *H02K 3/04* (2013.01)

(58) Field of Classification Search
CPC ..................... H01F 5/00; H01F 27/00–27/36
USPC .......... 336/65, 200, 220–223, 232, 206–208
See application file for complete search history.

(56) References Cited

U.S. PATENT DOCUMENTS

| | | |
|---|---|---|
| 4,645,961 A | 2/1987 | Malsky |
| 4,962,329 A | 10/1990 | Fujita et al. |
| 5,012,571 A | 5/1991 | Fujita et al. |

FOREIGN PATENT DOCUMENTS

JP          54159615 A   * 12/1979

* cited by examiner

*Primary Examiner* — Tuyen Nguyen

(57) ABSTRACT

In accordance with one embodiment, a High-Density, Folded Electromagnetic Coil comprises a plurality of wire spirals that are folded into substantially semicircles, stacked against each other, and have a common centerline to form a substantially high-density, electromagnetic coil. The wire spirals are electrically connected such that electric current flows through each wire spiral in series and in the same direction through each wire spiral.

8 Claims, 8 Drawing Sheets

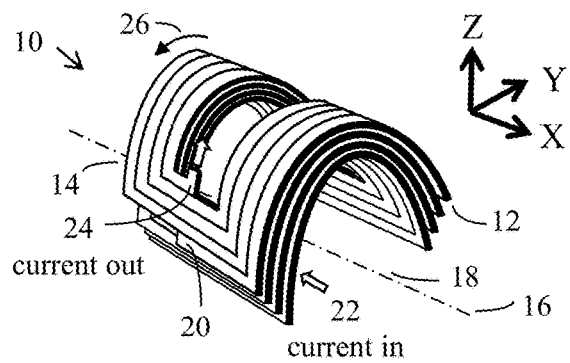
Fig. 1
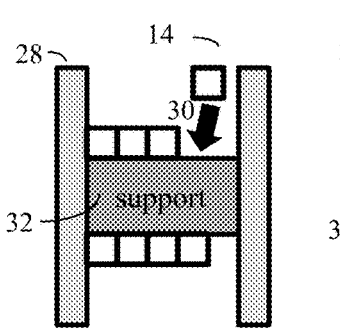   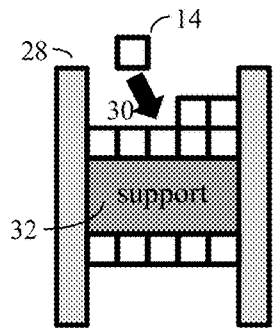   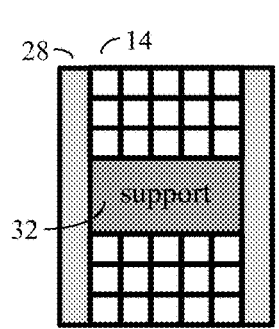
Fig. 2A              Fig. 2B              Fig. 2C
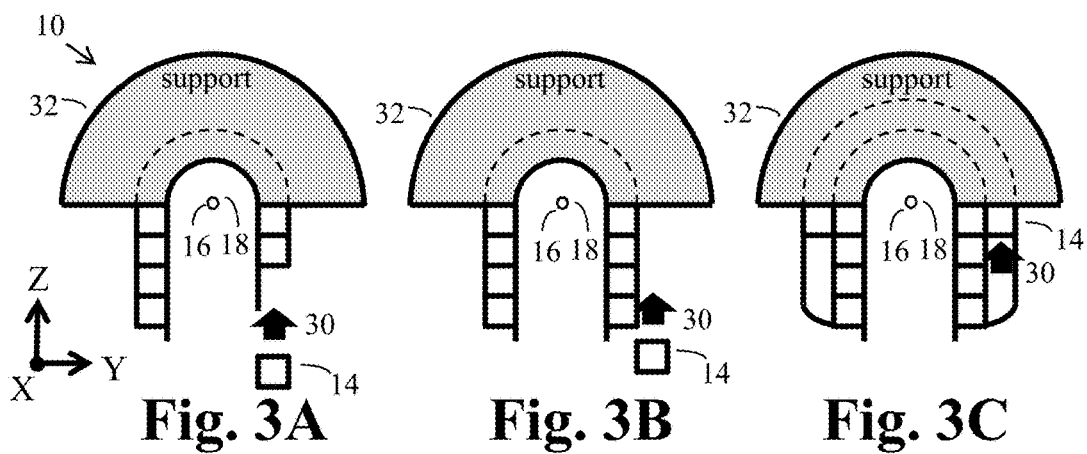
Fig. 3A              Fig. 3B              Fig. 3C

HIGH-DENSITY, FOLDED ELECTROMAGNETIC COIL

CROSS-REFERENCE TO RELATED APPLICATIONS

This application benefits from U.S. Pat. No. 8,487,486, filed 2013 Jul. 16 by the present inventor.

FEDERAL SPONSORED RESEARCH

Not applicable

SEQUENCE LISTING OF PROGRAM

Not applicable

BACKGROUND

Prior Art

The following is a tabulation of some prior art that presently appears relevant:

| U.S. patents | | |
| --- | --- | --- |
| Pat. No. | Issue Date | Patentee |
| 5,012,571 | May 7, 1991 | Fujita et al. |
| 4,962,329 | Oct. 9, 1990 | Fujita et al. |

Induction of an Electro Motive Force powers all electric motors and generators. The amount of Electro Motive Force induced by the relative motion of a magnet and wire is determined by Faraday's law of induction which is as follows.

$$E = -N d\phi_B/dt$$

Where, E is the Electro Motive Force and $\phi_B$ is the magnetic flux through a single loop, N is the number of turns, and t is time.

Thus, the Electro Motive Force is directly proportional to the number of turns in an electromagnetic coil. Thus, an increase in wire turns wound in a fixed volume coil increases power output, and a decrease in wire turns in a fixed volume decreases the power output. If there is little to no open space in an electromagnetic coil after winding, it is considered high-density. Thus, it is highly desirable to have a high density winding in a Folded Electromagnetic Coil as described in U.S. Pat. No. 8,487,486 and shown in FIG. 1 because it will produces more power than a low density coil.

SUMMARY

In accordance with one embodiment, a High-Density, Folded Electromagnetic Coil comprises a plurality of wire spirals that are folded into substantially semicircles, stacked against each other, and have a common centerline to form a substantially high-density, electromagnetic coil. The wire spirals are electrically connected such that electric current flows through each wire spiral in series and in the same direction through each wire spiral.

Advantages

A higher density of wire in a fixed volume equates to more turns exposed to magnetic flux from the magnet. According to Faraday's law of induction, more wire turns results in more power.

Furthermore, machining multiple wire spirals and arrays, folding, stacking, and electrically connecting them into a Folded Electromagnetic Coil is faster, cheaper, and better way to make electromagnetic coils than the traditional winding of a one-wire coil.

For some embodiments, the number of parts to fabricate and assemble is less than individually wound coils. Fewer parts make fabrication and assembly faster, easier, and less-expensive.

For some embodiments, the number of electrical connections is less than individually wound coils. Fewer electrical connections make fabrication and assembly faster, easier, and less-expensive.

BRIEF DESCRIPTION OF THE DRAWINGS

FIG. 1 shows an isometric view of four wire spirals folded and stacked to form an HD-FEC, FIGS. 2A to 2C show cut away views of a typical spool being wound with wire, and a winding force guiding the wire into position, FIGS. 3A to 3C show cut away views (YZ plane in FIG. 1) of an FEC being wound with wire, and the winding force guiding the wire into position.

Figure 4:
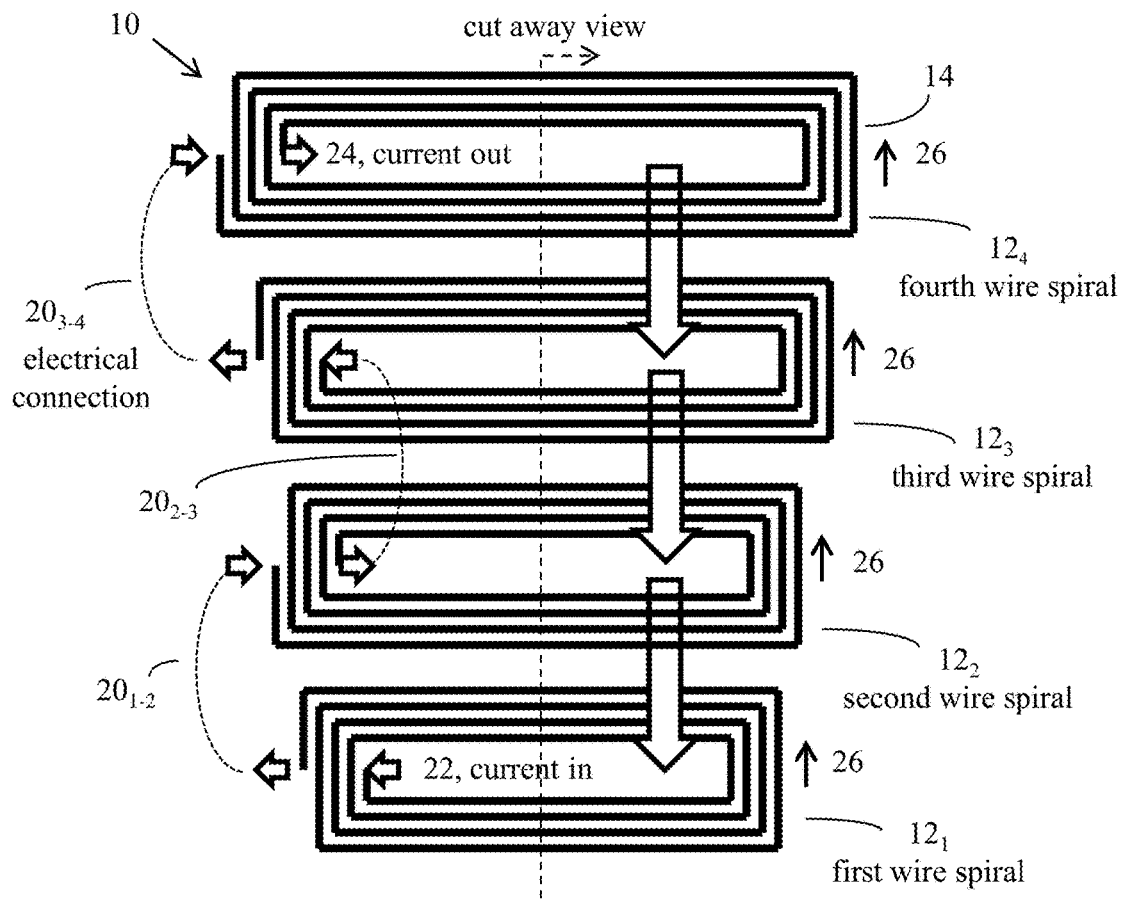
FIG. 4 shows a top view of the patterns of four wire spirals and their electrical connections before they are folded and stacked into an HD-FEC.

DRAWINGS—REFERENCE NUMERALS 10 first embodiment of a high-density, folded electromagnetic coil
12 wire spiral
14 electrically conductive wire
16 centerline
18 opening along centerline
20 electrical connection
22 electric current input 24 electric current output
26 electric current
28 spool
30 winding force
32 support for wire winding
34 force to push a plurality of wire spirals into a folded electromagnetic coil
36 magnet
38 rotor wheel
40 solid substrate of electrically conductive material
42 stamping machine
44 protrusions in stamping machine
50 second embodiment of a high-density, folded electromagnetic coil
52 wire array
54 substantially circular axis of wire array
56 array support
60 third embodiment of a high-density, folded electromagnetic coil
62 substantially spiral axis of wire array
64 substantially circular layers of overlaid wire array

DETAILED DESCRIPTION

First Embodiment, FIGS. 1-10

A High-Density, Folded Electromagnetic Coil (HD-FEC) 10 is illustrated in FIGS. 1, 5, 9, and 10 (isometric views) and FIGS. 3, 6-8 (side views) and FIG. 4 (top view). As shown in FIG. 1, an HD-FEC 10 has a plurality of wire spirals 12 wound with wire 14 that are folded into substantially semicircle shapes with varying semicircle radiuses such that they stack against each other with little to no open space between them and have a common centerline 16. Wire 14 can be any electrically conductive material such as pure or a mixture of copper, silver, aluminum, or gold made into a round, square, rectangular, or oval shaped wire. HD-FEC 10 is not a complete circle and has an opening 18 for objects to pass through it along centerline 16. Electrical connections 20 are made between all of wire spirals 12 such that there is only one wire-end for electric current input 22 and only one wire-end for electric current output 24, and electric current 26 flows through each wire spiral 12 in series and in the same direction through each said wire spiral 12.

Presently, most coils are formed by winding wire by hand or machines because it is fast, cost-effective, and high-density. For example, in a typical winding of a spool 28 as shown in FIG. 2A, winding force 30 guides wire 14 into position against a support 32 and previously laid wire 14 such that all wires 14 are constrained without wasted space in the first row of the winding. When a second row of turns is added (FIG. 2B), the direction of force 30 is changed to continue positioning wire 14 against previously laid wires 14 such that all wires 14 are constrained without wasted space. This reversal of direction of force 30 for each new row of wire 14 can continue until spool 28 is fully wound (FIG. 2C). AH wire 14 is wound in a single plane of spool 28 rotation.

The Folded Electromagnetic Coil is a new magnetic flux design for motors and generators as described in U.S. Pat. No. 8,487,486. Unlike other electromagnetic coils, the magnetic flux from magnets rotating relative to a folded electromagnetic coil or a folded electromagnetic coil rotating relative to fixed magnets directly induces an electro motive force into said coil. Consequently, with this design, magnetic iron to transfer the magnetic flux from one location to another in a power-system is not necessary or used, substantially reducing power losses and weight.

However, typical methods of winding do not produce high-density, folded electromagnetic coils. This is because its loop needs to be wound in two perpendicular planes rather than just one in a standard winding. Supports can be made to efficiently wind one layer of a Folded Electromagnetic Coil winding, but the second layer is unsupported using the typical winding method, resulting in a low density winding.

As shown if FIG. 1, each loop of wire 14 in a Folded Electromagnetic Coil is wound in the YZ plane and in the XZ plane, changing four times in direction by 90 degrees. Using support 32 as shown in FIG. 3A, the first row of a winding can be supported in both planes, YZ and XZ. However, as shown in FIG. 33, the second row of that winding in the XZ plane has no support 32 or a previously laid wire 14 to hold wire 14 to the outside of the row as desired. Consequently, winding force 30 pushes wire 14 against support 32, skipping multiple loops (FIG. 3C). Skipping loops results in an unacceptably low winding density of nearly half of what it could be.

Fujita et al. in U.S. Pat. Nos. 5,012,571 and 4,962,329 describe a method of making spiral coils on printed-circuit boards, so winding wire 14 is not necessary. Their spiral coils are stacked as layers in a multilayered coil. While this approach may avoid the winding problem describe above, making printed circuits is costly and time consuming to make. Furthermore, their spirals are described as all the same size. To form optimum shaped FECs, the spirals may need to be made in different sizes, further adding to the cost and time to make a folded coil. Thus, for high winding density, a new design for the Folded Electromagnetic Coil was needed. This new design is best introduced by laying out its components.

FIG. 4 shows an example of a High-Density, Folded Electromagnetic Coil (HD-FEC) 10 having four wire spirals 12 before they are folded and stacked. First wire spiral $12_1$ is designed to be on the inside of HD-FEC 10, and in this example, the length of the first to fourth wire spiral 12 progressively increases to create an HD-FEC with all four wire spirals 12 having a half circle shape when folded. The location of electrical connections 20 are centered in at least one dimension of the pattern so as to minimize wire used in electrical connections 20 to adjacent wire spirals 12.

The arrangement of electrical connections 20, electric current input 22, and electric current output 24 from HD-FEC 10 are designed as follows to ensure that electric current 26 flows through each wire spiral 12 in series and in the same direction through each said wire spiral 12.

Electric current 26 enters on the inside of first wire spiral $12_1$, flows through it, and exits on the outside of first wire spiral $12_1$ where electrical connection $20_{1-2}$ routes it to the outside of second wire spiral $12_2$.

Electric current 26 enters on the outside of second wire spiral $12_2$, flows through it, and exits on the inside of second wire spiral $12_2$ where electrical connection $20_{2-3}$ routes it to the inside of third wire spiral $12_3$.

Electric current 26 enters on the inside of third wire spiral $12_3$, flows through it, and exits on the outside of third wire spiral $12_3$ where electrical connection $20_{3-4}$ routes it to the outside of fourth wire spiral $12_4$.

Electric current 26 enters on the outside of fourth wire spiral $12_4$, flows through it, and exits HD-FEC 10 on the inside of fourth wire spiral $12_4$.

Figure 5:
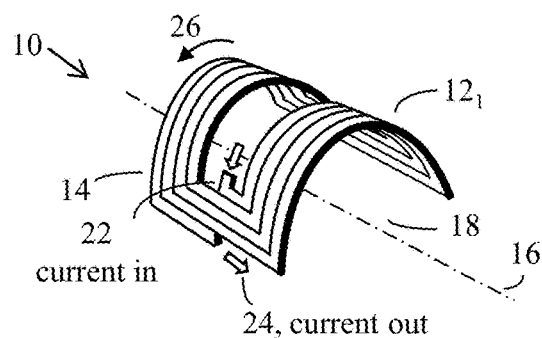
FIG. 5 shows an isometric view of one wire spiral after folding about a centerline.
Figure 6:
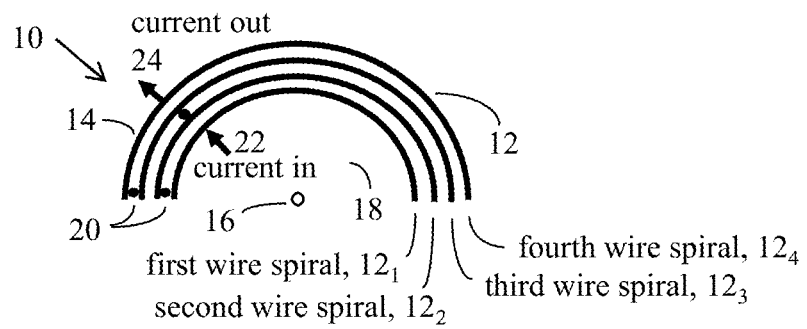
FIG. 6 shows a side view of the four wire spirals in FIG. 4 after folding and stacking.

FIG. 5 shows a single wire spiral $12_1$ after it has been folded about centerline 16, and FIG. 6 shows a side view of all four wire spirals 12 in FIG. 4 after folding and stacking them into an HD-FEC 10 with a common centerline 16.

Figure 7:
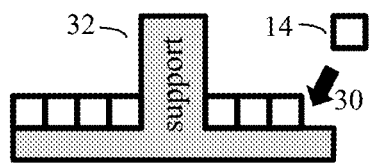
FIG. 7 shows a cut away view of a wire spiral in FIG. 4 being wound before folding.
Figure 8:
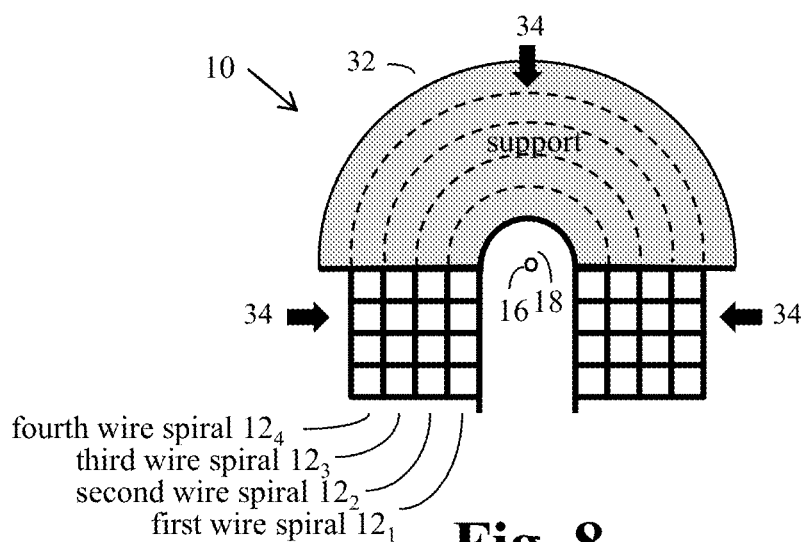
FIG. 8 shows four wire spirals folded, stacked, and forced against a support.

As shown in FIG. 7, a wire spiral 12 has only one row of wire 14 which is wound in only one plane. As with a typical winding shown in FIG. 2A, winding force 30 pushed wire 14 against support 32 and previously laid wire 14, resulting in a high-density position. The complexity of winding an HD-FEC 10 in two planes is avoided by folding wire spiral 12 after winding only one row and stacking multiple wire spirals 12 such that they can be electrical connected 20 into a single High-Density Folded Electromagnetic Coil 10. FIG. 8 shows how a stacking force 34 presses a plurality of wire spirals 12 into an HD-FEC 10. Glue, mechanical structure, and other forms of adhesion can be used to hold wire spirals 12 into the desired position.

The folding of each wire spiral 12 can be done by hand or machine and with the assistance of fixtures, supports, mandrels, and any device that helps form the desired folded wire spiral shape. Stacking of wire spirals 12 can be done by hand or machine and with the assistance of fixtures, supports, mandrels, and any device that helps stack the wire spirals 12 together. Electrical connections 20 can be made by hand or machines using solder, twist connectors, press connectors, fusion, melting, and any other technique that electrically connects two wires 14.

Electric current input 22 and electric current output 24 can be located anywhere in HD-FEC 10 to enable electric current 26 to flow through each wire spiral 12 in series and in the same direction through each said wire spiral 12. Likewise, electrical connections 20 can be placed anywhere on a wire spiral 12 as long as it enable electric current 26 to flow through each wire spiral 12 in series and in the same direction through each said wire spiral 12.

Figure 9:
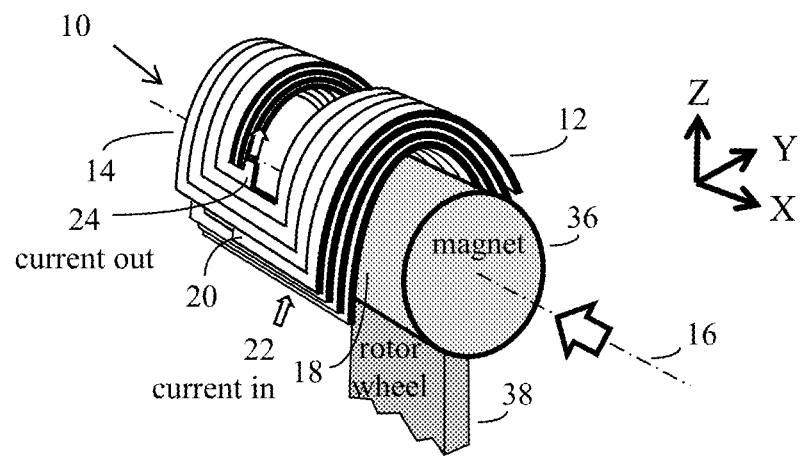
FIG. 9 shows an HD-FEC with a magnet mounted to a rotor wheel passing through the HD-FEC opening along a centerline.

FIG. 9 shows an HD-FEC 10 with a magnet 36 passing through opening 18 and along centerline 16. Magnet 36 is supported by rotor wheel 38 which rotates magnet 36 along centerline 16 and through opening 18 without obstruction.

Figure 10:
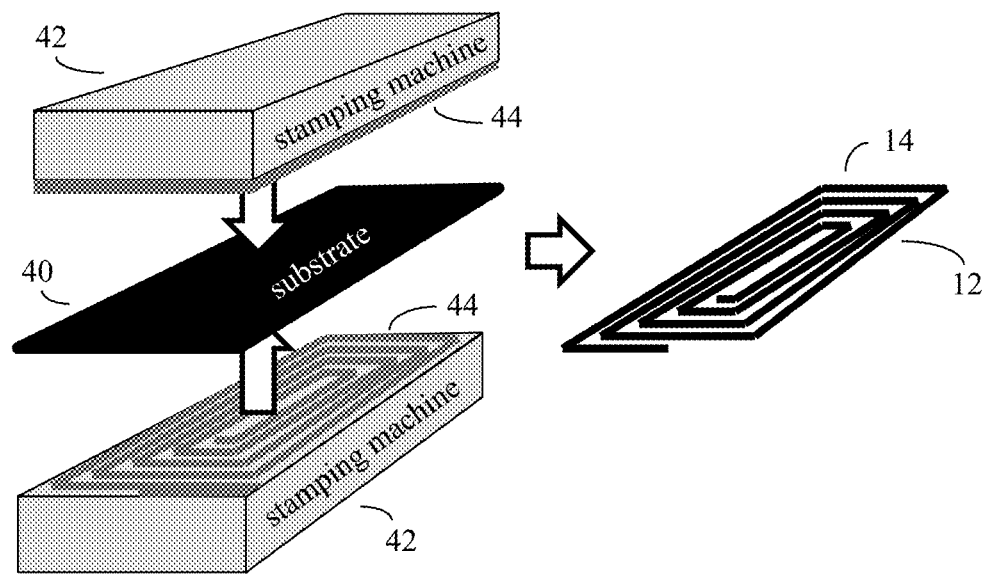
FIG. 10 shows a substrate of electrically conductive material machined into a wire spiral.

FIG. 10 shows how wire spiral 12 can be made by machining rather than winding wire 14. The machining process starts with a solid substrate 40 of electrically conductive material, such as pure or a combination of copper, silver, aluminum, or gold. A tool of some type can machine substrate 40 to produce a wire spiral 12 as shown in FIG. 10. There are many ways of machining the pattern such as stamping, molding, water-jet cutting, flame cutting, plasma cutting, laser cutting, electrical discharge machining, and additive manufacturing (3D printing).

For example, stamping a wire spiral 12 would likely be a faster process than winding one because it is a one-step process. As shown in FIG. 10, substrate 40 is stamped into wire spiral 12 by a stamping machine 42 with only one step. Stamping machine 42 has sharp protrusions 44 to cut substrate 40 into the desired pattern of a wire spiral 12 from one direction or two opposing directions as shown.

After machining, wire spiral 12 would have the same pattern and function of a wound wire spiral 12. A machined wire spiral 12 could be sprayed, immersed, or otherwise coated with an electrical insulation to prevent shorts in wire spiral 12 and also provide physical support.

Second Embodiment, FIGS. 11-14

Figure 11:
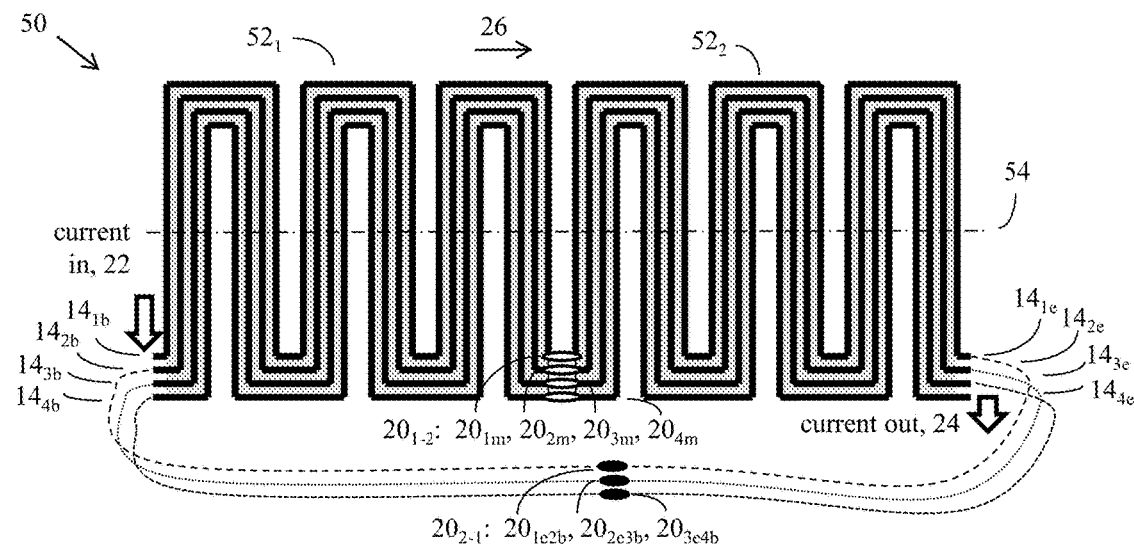
FIG. 11 shows a top view of two wire-arrays of the second embodiment.
Figure 12:
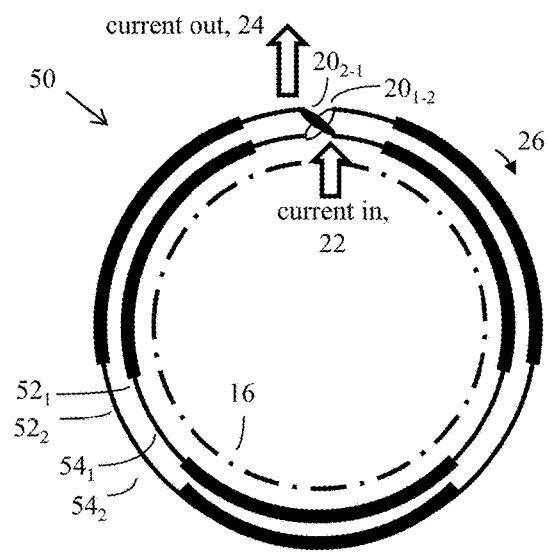
FIG. 12 shows a side view of two wire-arrays bent into a circle.
Figure 13:
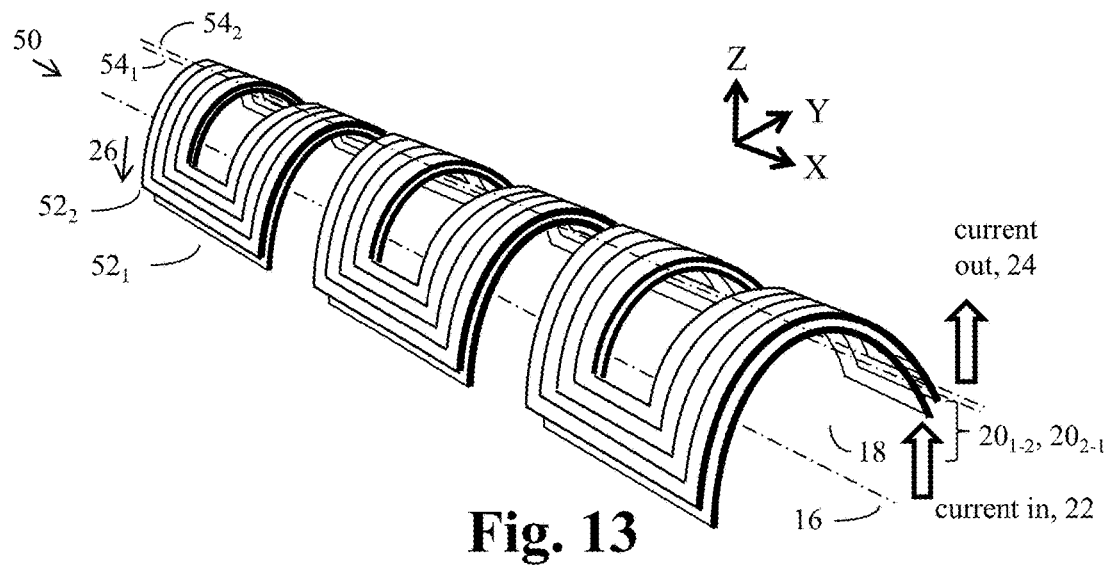
FIG. 13 shows an isometric view of two folded wire arrays stacked on top of each other.
Figure 14:
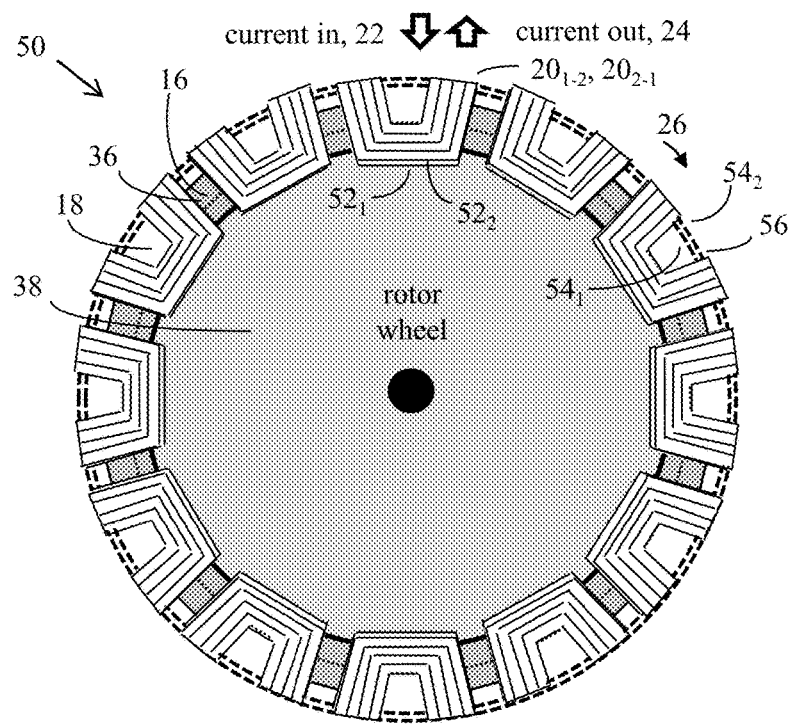
FIG. 14 shows a side view of magnets on a rotor wheel passing through two folded wire arrays.

A second embodiment of a High-Density, Folded Electromagnetic Coil (HD-FEC) 50 is illustrated in FIG. 11 (top view), FIGS. 12, 14 (side views) and FIG. 13 (isometric view). FIG. 11 shows an HD-FEC 50 with two wire arrays 52 having wires 14 positioned substantially side by side in a substantially square wave pattern symmetric about an axis 54 that is bent to form substantially a circle with the beginning of wires 14 and the end of wires 14 in close proximity. Electrical connections $20_{1-2}$ between a first wire array $52_1$ and a second wire array $52_2$, and electrical connections $20_{2-1}$ between second wire array $52_2$ and first wire array $52_1$ results in electric current 26 passing through each wire 14 in series and in the same direction. Wire array 52 can be machined as described for first embodiment of HD-FEC 10.

Relative to the flow of electric current 26, electric current input 22 to HD-FEC 50 is at the beginning of first wire $14_{1b}$, and electric current output 24 from HD-FEC 50 is at the end of fourth wire $14_{4e}$.

Electric current 26 enters the beginning of first wire $14_{1b}$ of first wire array $52_1$ and flows through to the end of first wire array $52_1$ where electrical connection $20_{1m}$ connects first wire $14_{1b}$ of first wire array $52_1$ with first wire $14_{1e}$ of second wire array $52_2$. When electric current 26 reaches the end of first wire $14_{1e}$ in second wire array $52_2$, it is routed to the beginning of second wire $14_{2b}$ of first wire array $52_1$ by electric connection $20_{1e2b}$.

Electric current 26 enters the beginning of second wire $14_{2b}$ of first wire array $52_1$ and flows through to the end of first wire array $52_1$ where electrical connection $20_{2m}$ connects second wire $14_{2b}$ of first wire array $52_1$ with second wire $14_{2e}$ of second wire array $52_2$. When electric current 26 reaches the end of second wire $14_{2e}$ in second wire array $52_2$, it is routed to the beginning of third wire $14_{3b}$ of first wire array $52_1$ by electric connection $20_{2e3b}$.

Electric current 26 enters the beginning of third wire $14_{3b}$ of first wire array $52_1$ and flows through to the end of first wire array $52_1$ where electrical connection $20_{3m}$ connects third wire $14_{3b}$ of first wire array $52_1$ with third wire $14_{3e}$ of second wire array $52_2$. When electric current 26 reaches the end of third wire $14_{3e}$ in second wire array $52_2$, it is routed to the beginning of fourth wire $14_{4b}$ of first wire array $52_1$ by electric connection $20_{3e4b}$.

Electric current 26 enters the beginning of fourth wire $14_{4b}$ of first wire array $52_1$ and flows through to the end of first wire array $52_1$ where electrical connection $20_{4m}$ connects fourth wire $14_{4b}$ of first wire array $52_1$ with fourth wire $14_{4e}$ of second wire array $52_2$. When electric current 26 reaches the end of fourth wire $14_{4e}$ in second wire array $52_2$, it exits HD-FEC 50.

FIG. 12 is a side view of two wire arrays $52_1$ and $52_2$ stacked against each other with their axes $54_1$ and $54_2$ shaped into substantially concentric circles. Electrical connections $20_{1-2}$ electrically connect wire array $52_1$ to wire array $52_2$, and electrical connections $20_{211}$ electrically connect wire array $52_2$ to wire array $52_1$ such that electric current 26 flows through each wire in series and in the same direction. Centerline 16 is substantially circular and concentric to circular axis $54_1$ and $54_2$.

FIG. 13 shows wire array $52_1$ with axis $54_1$ and wire array $52_2$ with axis $54_2$ folded about a substantially circular centerline 16 forming opening 18 and illustrating electrical connections $20_{112}$ and $20_{2-1}$, electrical current input 22, and electrical current output 24.

FIG. 14 shows two arrays $52_1$ to $52_2$ overlaid into two layers and electrically connected with electrical connections $20_{1-2}$ and $20_{2-1}$, electrical current input 22, and electrical current output 24 to ensure that electric current 26 flows through each wire 14 in series and in the same direction. Magnets 36 mounted to rotor wheel 38 rotate freely through opening 18 and along centerline 16. A mechanical array support 56 holds arrays $52_1$ to $52_2$ into place relative to substantially circular axis $54_1$ and $54_2$.

Third Embodiment, FIGS. 15-18

Figure 15:
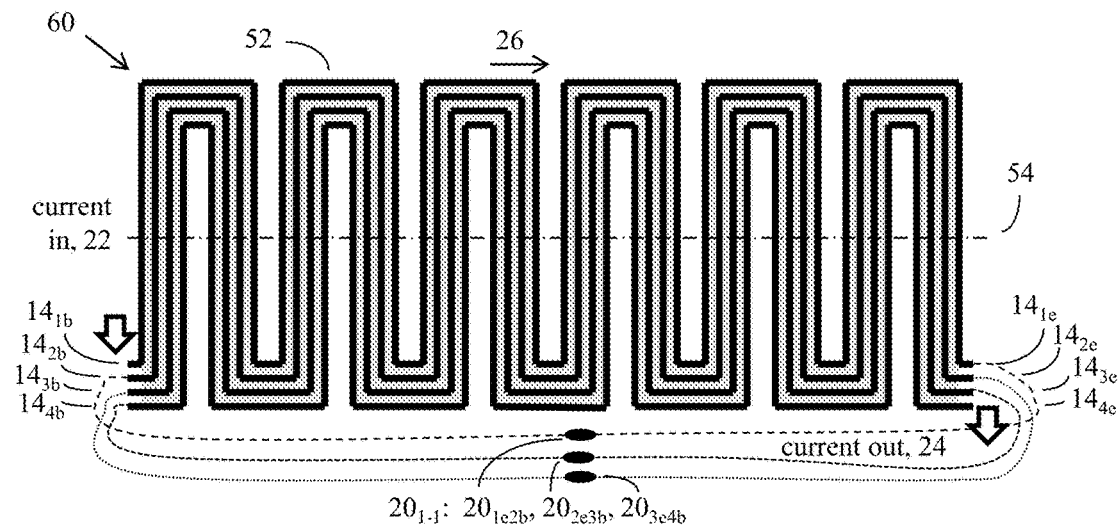
FIG. 15 shows a top view of a wire-array of the third embodiment.
Figure 16:
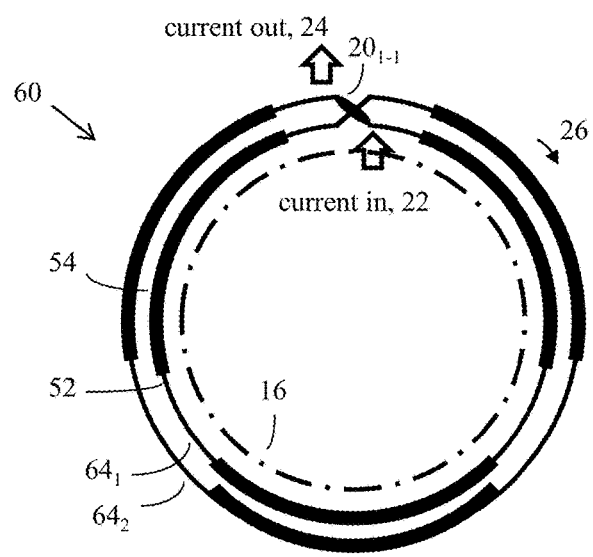
FIG. 16 shows a side view of a wire-array bent into a spiral of overlaid layers.
Figure 17:
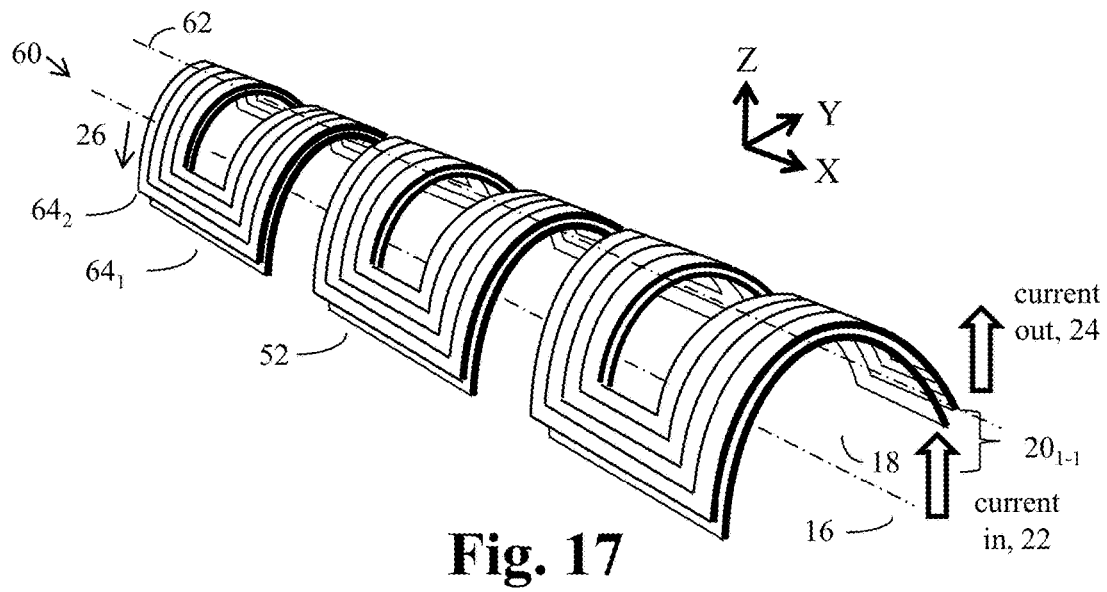
FIG. 17 shows an isometric view of two layers of a folded wire array overlaid on top of each other.
Figure 18:
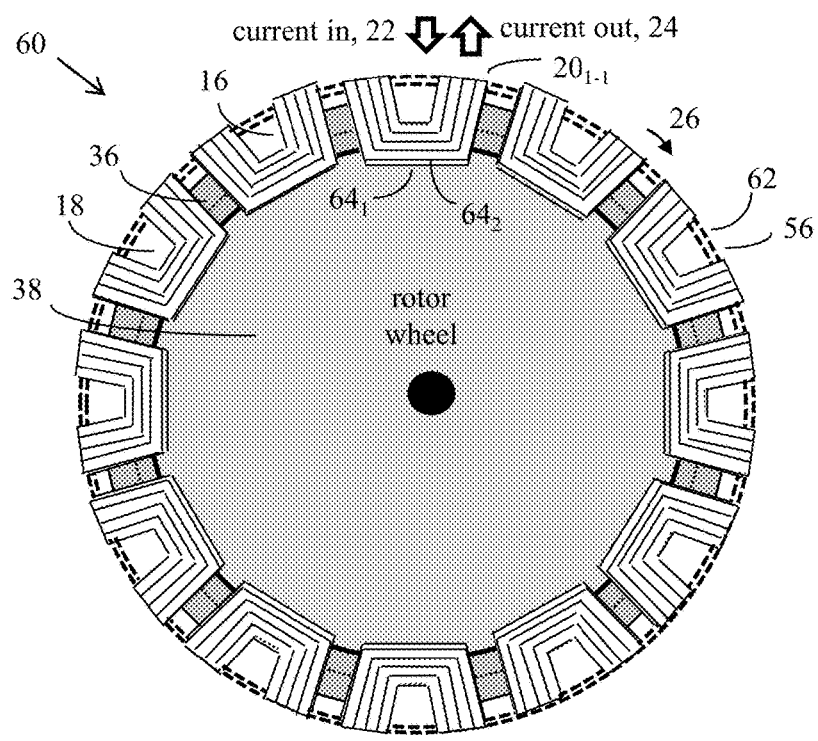
FIG. 18 shows a side view of magnets on a rotor wheel passing through a folded and layered wire array.

A third embodiment of a High-Density, Folded Electromagnetic Coil (HD-FEC) 60 is illustrated in FIG. 15 (top view), FIGS. 16, 18 (side views) and FIG. 17 (isometric view). FIG. 15 shows an HD-FEC 60 having only one wire array 52 with wires 14 positioned substantially side by side in a substantially square wave pattern symmetric about a spiral axis 62 that is bent and overlaid on itself to form a plurality of substantially circular layers 64 of wires 14. Electrical connections $20_{1\text{-}1}$ between the beginning of wire array 52 and the end of wire array 52 result in electric current 26 passing through each wire 14 in series and in the same direction. Wire array 52 can be machined as described for first embodiment of HD-FEC 10.

For a similar size device, the number of parts in a HD-FEC 60 is less than first embodiment HD-FEC 10 and second embodiment HD-FEC 50 because there is only one wire array 60 regardless of the number of square wave patterns (folded electromagnetic coils). Also, the number of electrical connections 20 is less than the other embodiments because there is only one connection 20 for each wire 14 regardless of the number of layers 64 and number of square wave patterns (folded electromagnetic coils)

Relative to the flow of electric current 26, electric current input 22 to HD-FEC 60 is at the beginning of first wire $14_{1b}$, and electric current output 24 from HD-FEC 60 is at the end of fourth wire $14_{4e}$.

Electric current 26 enters the beginning of first wire $14_{1b}$ of wire array 52 and flows to the end of first wire $14_{1e}$ where electric connection $20_{1e2b}$ routes it to the beginning of second wire $14_{2b}$.

Electric current 26 enters the beginning of second wire $14_{2b}$ of wire array 52 and flows to the end of second wire $14_{2e}$ where electric connection $20_{2e3b}$ routes it to the beginning of third wire $14_{3b}$.

Electric current 26 enters the beginning of third wire $14_{3b}$ of wire array 52 and flows to the end of third wire $14_{3e}$ where electric connection $20_{3e4b}$ routes it to the beginning of fourth wire $14_{4b}$.

Electric current 26 enters the beginning of fourth wire $14_{4b}$ of wire array 52 and flows to the end of fourth wire $14_{4e}$ where electric current 26 exits HD-FEC 60.

FIG. 16 is a side view of wire array 52 where axis 62 is bent into a spiral overlaying itself to form two layers $64_1$ and $64_2$ stacked against each other and shaped into substantially concentric circles. Electrical connections $20_{1\text{-}1}$ electrically connect wire 14 beginnings and ends such that electric current 26 flows through each wire in series and in the same direction. Centerline 16 is substantially circular and concentric to the substantially circular layers $64_1$ and $64_2$.

FIG. 17 shows wire array 52 with axis 62 folded about centerline 16 forming opening 18 and illustrating electrical connections $20_{1\text{-}1}$, electrical current input 22, and electrical current output 24.

FIG. 18 shows array 52 overlaid into a spiral with axis 62 and two substantially circular layers $64_1$ and $64_2$ with electrical connections $20_{1\text{-}1}$, electrical current input 22, and electrical current output 24 to ensure that electric current 26 flows through each wire 14 in series and in the same direction. Magnets 36 mounted to rotor wheel 38 rotate freely through opening 18 and along centerline 16. A mechanical array support 56 holds array 52 into place relative to spiral axis 62.

Advantages

From the description above, a number of advantages of my high-density, folded electromagnetic coil become evident:

(a) The plurality of wire spirals and arrays, folded, stacked, and electrically connected into a folded electromagnetic coil substantially increases the density of the coil when compared to a folded electromagnetic coil wound as a single wire coil. The power of electromagnetic systems is directly proportional to increased density such that these devices will become more powerful with a high-density, folded electromagnetic coil. Thus, without sacrificing performance, millions of motors and generators can become smaller, lighter, more efficient, and less expensive.

(b) Machining coils can be faster, easier, and less expensive than winding them. When winding wire, each wire loop must be wound one at a time. Even when winding is automated, the number of turns can be so large that winding can take a long time. Furthermore, winding machines can be expensive and high-maintenance. In contrast, machining such as stamping can make an entire wire spiral or wire array in one step, regardless of the number of loops. Folding and stacking wire spirals or wire arrays can be fast and efficient when automated. Thus, machining coils can be potentially faster, easier, and less-expensive than winding coils.

(c) Coils made of wire arrays have fewer parts to assemble than individually wound coils. For example, in a device with 30 folded electromagnetic coils, each coil requires fabrication and assembly. In contrast, a single wire-array overlaid many times into 30 square wave patterns could replace all 30 individual coils with one fabrication and one assembly. Fewer parts make fabrication and assembly faster, easier, and less-expensive.

(d) When a single wire array is overlaid into multiple layers, the number of electrical connections can be much less than having multiple wire spirals or multiple wire arrays. This is because there is only one connection for each wire regardless of the number of folded electromagnetic coils. For example, a single wire-array of 10 wires overlaid many times into 30 square wave patterns (folded electromagnetic coils) would have only 10 electrical connections compared to 60 electrical connections for 30 independent coils (two wires per coil). Fewer electrical connections make fabrication and assembly faster, easier, and less-expensive.

CONCLUSIONS, RAMIFICATIONS, AND SCOPE

Accordingly, the reader will see that the High-Density, Folded Electromagnetic Coil can increase the power of motors and generators and make their fabrication and assembly faster, easier, and less-expensive. There are millions of motors and generators in the world, and potentially, each can be replaced with devices incorporating HD-FECs. These devices will be more powerful, lighter, and less expensive.

I claim:

1. A high-density, folded electromagnetic coil, comprising:

a. a wire array where a plurality of electrically conductive wires are positioned substantially side by side in substantially square wave patterns repetitively alternating from one side to the other of a spiral axis that is bent and overlaid on itself in the same plane to form a plurality of spiral layers of said wire array, and b. electrical connections between said plurality of electrically conductive wires in said wire array that reduce the number of paths of electrical current to one or more, whereby said wire array with said electrical connections provides a high density of said electrically conductive wires.

2. The wire array of claim 1 wherein said wire array is made of electrically conductive material such as pure or a mixture of copper, silver, aluminum, or gold with a round, square, rectangular, or oval shape.

3. The wire array of claim 1 wherein said wire array is formed by a means of machining such as adding said electrically conductive material into said wire array pattern with 3D printing and such as laser cutting a solid substrate of said electrically conductive material and leaving said wire array pattern.

4. The wire array of claim 1 wherein said wire array is held together in a fixed shape by glue, mechanical structure, and other forms of adhesion.

5. The electrical connections of claim 1 wherein said connections are solder, a twist cap, a pressure fit, a clamp, or any combination of those connectors.

6. The wire array of claim 1 wherein said wire array is folded into a semicircle about a substantially circular centerline concentric to said spiral axis of square wave patterns and forming an opening such that an object can pass unobstructed along said centerline and through said opening.

7. The wire array of claim 1 wherein said wire array is two or more said wire arrays that have been electrically connected such that said electric current can pass through each of said wires in series and in the same direction.

8. The wire array of claim 1 wherein said wire array is formed by adding said electrically conductive material into said wire array pattern.

* * * * *